US010058111B2

(12) United States Patent
Witteveen

(10) Patent No.: US 10,058,111 B2
(45) Date of Patent: Aug. 28, 2018

(54) ENCAPSULATED FLAVOR PARTICLE

(71) Applicant: Givaudan, S.A., Vernier (CH)

(72) Inventor: Frans Witteveen, CM Leusden (NL)

(73) Assignee: Givaudan, S.A., Vernier (CH)

( * ) Notice: Subject to any disclaimer, the term of this patent is extended or adjusted under 35 U.S.C. 154(b) by 463 days.

(21) Appl. No.: 14/401,634

(22) PCT Filed: May 28, 2013

(86) PCT No.: PCT/EP2013/060983
§ 371 (c)(1),
(2) Date: Nov. 17, 2014

(87) PCT Pub. No.: WO2013/178638
PCT Pub. Date: Dec. 5, 2013

(65) Prior Publication Data
US 2015/0140181 A1    May 21, 2015

(30) Foreign Application Priority Data
May 30, 2012  (GB) .................................... 1209597.2

(51) Int. Cl.
*A23L 29/219* (2016.01)
*A23L 1/22* (2006.01)
*A23G 4/06* (2006.01)
*A23G 4/20* (2006.01)
*A23L 27/00* (2016.01)

(52) U.S. Cl.
CPC .......... *A23L 1/22016* (2013.01); *A23G 4/068* (2013.01); *A23G 4/20* (2013.01); *A23L 27/72* (2016.08); *A23L 29/219* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 5,424,088 A * | 6/1995 | Christianson | A21D 2/183 426/573 |
| 6,056,949 A | 5/2000 | Menzi et al. | |
| 2003/0157232 A1 | 8/2003 | Buwalda et al. | |
| 2005/0163833 A1 | 7/2005 | Muller | |
| 2010/0068268 A1* | 3/2010 | Rahmouni | A61K 9/1652 424/464 |
| 2011/0117180 A1* | 5/2011 | Yan | A61K 8/11 424/450 |
| 2011/0142994 A1* | 6/2011 | Buwalda | A23L 29/212 426/62 |
| 2011/0319503 A1 | 12/2011 | Muller et al. | |
| 2012/0006226 A1 | 1/2012 | Muller et al. | |
| 2014/0342053 A1* | 11/2014 | Penhasi | A23L 1/22016 426/96 |

FOREIGN PATENT DOCUMENTS

| | | |
|---|---|---|
| WO | WO 01/78526 A1 | 10/2001 |
| WO | WO 2008/075945 A1 | 6/2008 |
| WO | WO 2009/080838 A2 | 7/2009 |

OTHER PUBLICATIONS

PCT/EP2013/060983—International Search Report, dated Nov. 12, 2013.
PCT/EP2013/060983—International Written Opinion, dated Nov. 12, 2013.
PCT/EP2013/060983—International Preliminary Report on Patentability, dated Dec. 2, 2014.
GB 1209597.2—British Search Report, dated Sep. 28, 2012.
Jane Bryne, "Avebe Targets Low Fat Cream Cheese and Ice-Cream with New Etenia Starch Application", Foodnavigator.com, Oct. 3, 2011 [date accessed Sep. 26, 2012], William Reed Business Media.
Hansen, et al., "Gel Texture and Chain Structure of Amylomaltase-Modified Starches Compared to Gelatin", Food Hydrocolloids, 2007, pp. 1551-1566, vol. 22, No. 8, Elsevier.

* cited by examiner

*Primary Examiner* — Tamra L. Dicus
(74) *Attorney, Agent, or Firm* — Curatolo Sidoti Co., LPA; Joseph G. Curatolo; Salvatore A. Sidoti

(57) ABSTRACT

An encapsulated flavor particle, comprising a vegetable matter particulate core and a flavor coating comprising a sprayed emulsion of flavor and thermoreversible potato starch, the thermoreversible potato starch comprising at least 80% by weight of amylopectin modified with amylomaltase enzyme. The particles provide good flavor release characteristics in consumable compositions, such as chewing gums, beverages, foodstuffs, toothpastes, mouthwashes and the like, while avoiding the use of gelatin.

8 Claims, No Drawings

ENCAPSULATED FLAVOR PARTICLE

CROSS REFERENCE TO RELATED APPLICATIONS

This application is a national stage application of International Application No. PCT/EP2013/060983, filed 28 May 2013, which claims priority from Great Britain Patent Application No. 1209597.2, filed 30 May 2012, from which applications priority is claimed, and which are incorporated herein by reference.

This disclosure relates to a method of replacing gelatine and to products produced thereby.

Gelatin has long been a staple in the flavour encapsulation, mainly because it is both cheap and edible. However, the worry about its sources, especially in the wake of the various outbreaks of BSE ("mad cow disease"), and the rising proportions of vegetarians, who want no exposure to animal products, has led to the desire for a replacement of gelatine by more acceptable alternatives.

One such possible alternative is starch, which is of plant origin and is relatively cheap. There has been a number of approaches to starch encapsulation, typical examples of which include US Publications 2005/163833 and 2011/319503. Both of these applications apply particular methods to the formation of capsules.

It has now been found that it is possible to make an encapsulated flavour by a simple method that utilises particular starches. There is therefore provided an encapsulated flavour particle, comprising a vegetable matter particulate core and a flavour coating comprising a sprayed emulsion of flavour and thermoreversible potato starch, the thermoreversible potato starch comprising at least 80% by weight of amylopectin modified with amylomaltase enzyme.

There is further provided a method of making an encapsulated flavour, comprising the steps of
(i) dissolving a thermoreversible potato starch in water at an elevated temperature suitable for dissolving it and cooling to 60° C. minimum;
(ii) emulsifying into this solution a flavour while maintaining the temperature, and
(iii) spraying the emulsion on to core particles of vegetable matter suspended in a fluidised bed;
the thermoreversible potato starch comprising at least 80% by weight of amylopectin modified with amylomaltase enzyme.

By "thermoreversible" potato starch is meant a starch that can change from the solid (gel) state to the liquid state. Any potato starch that exhibits this property and that also comprises at least 80% by weight of amylopectin modified with amylomaltase enzyme is suitable for use in this process. Thermoreversibility is not a property of natural starches, but only of modified ones, and these are available commercially. A typical example of such a starch is Etenia™ QS (ex AVEBE).

The vegetable matter core may be any vegetable matter that can be powdered to a sufficiently fine degree. This is typically from 80-750 micron, particularly from 200-250 micron A particular example is tapioca, others including rice, wheat, maize, sorghum, sago and pea. Typical useful commercial materials include Beneo Remyflo™ R 500-TT (rice) and Tapiocaline™ CR521 (tapioca).

The flavour may be any desired flavour. Non-limiting examples include mint flavours such as menthol, peppermint and spearmint flavour and fruit flavours such as berry, apple, pear, strawberry, cherry, lemon and bergamot.

In the process, the core material is suspended in a fluidised bed and sprayed with an emulsion of the thermoreversible potato starch and flavour.

In a typical process, the thermoreversible potato starch is firstly dissolved in water at a temperature of at least 70° C. To this solution, any other desired powdered ingredients are added. Typical such ingredients include emulsifiers, and typical non-limiting examples of these include dextrinized waxy maize, starch octenyl succinate (available under the trade name Capsul) and gum Arabic. Others include fillers, such as maltodextrin and sugar, the latter especially in the case of material destined for use in sugar-containing applications such as chewing gums. There may also be added plasticizer, typically a polyol such as glycerol, sorbitol, mannitol, maltitol, erythritol, xylitol, and the like.

To this solution is added an emulsion of a flavour. This has a particle size of typically 1-3 micron, and is made in a homogeniser by conventional means.

The resulting blend is sprayed on to a suspension of particulate vegetable matter suspended in a fluidised bed. This is done under conditions of fluidisation and heating. Typical examples of equipment could be a fluid bed (Wurster or top spray system) that can provide the necessary coating of the particles. The spraying of the emulsion will be continued until the particles reach a desired size, at which point spraying is stopped and the particles removed and sieved.

The fluidised bed equipment is operated according to the normal practices and within the recognised parameters of the art. Typical operating conditions are as follows:
Inlet temperature 60-110° C., particularly about 95° C.
Product Temperature 35-90° C., particularly about 65° C.
Air flow rate 20-140 $M^3$/h, particularly about 60 $M^3$/h
Nozzle air pressure 0.5-6 bar, particularly about 4 bar The use of the word "about" here merely indicates that absolute precision in these values is not required. Moreover, it may sometimes be possible and even appropriate to work outside the given ranges. The skilled person will be able to determine when this is appropriate in each case.

In a further embodiment, a further coating may be sprayed on to the particles. This can confer useful controlled release properties, particularly for chewing gum. The further coating is typically an aqueous solution of methyl cellulose, but other well-known coating materials, such as (but not limited to) modified starches, gum Arabic and ethyl cellulose may also be used.

The resulting product is an encapsulated flavour that performs as well as the known gelatine-based encapsulates, but which is not gelatine-based. There is therefore provided an encapsulated flavour comprising flavour and poly-saccharide. There is additionally provided an encapsulated flavour preparable by a method as hereinabove described.

The encapsulated flavour may be used in any application in which such encapsulates are normally used, for example, all types of consumable products. By "consumable product" is meant a product that is taken into the mouth either for ingestion (such as foodstuffs, beverages and confectionery) or for brief retention therein and then expulsion (such as toothpastes and toothgels, and mouthwashes and rinses). One particular use is chewing gums. There is therefore provided a consumable product, comprising a consumable product base and an encapsulated flavour as hereinabove described. There is also provided a method of flavouring a consumable product, comprising the provision of a consumable product base and the addition thereto of an encapsulated flavour as hereinabove defined.

The disclosure is further described with reference to the following non-limiting examples, which describe particular embodiments.

EXAMPLE 1

Preparation of Particles
The ingredients are shown below:

| Material | Gram |
|---|---|
| A | |
| Etenia QS | 122 |
| Water | 366 |
| Gum Arabic | 91 |
| PO 58* | 46 |
| Xylitol | 34 |
| Glycerol | 30 |
| Peppermint flavour | 76 |
| B | |
| Rice grits Beneo | 25 |
| C | |
| Methyl Cellulose | 17 |
| Water | 193 |

*Hardened palm oil fat

The Materials A are mixed, dissolved in hot water and homogenised to form an emulsion of flavour particle size of between 1-3 micron. This emulsified material A is sprayed and coated on material B, which is suspended in a GPCG01 fluid bed ex Glatt operated according to the following process parameters:
Inlet temperature 95° C.
Product temperature 65° C.
Air flow rate 30 M³/h
Nozzle air pressure 4 bar As the rice grit is fluidised in the fluid bed, the emulsion is sprayed on to the fluidised rice grit, spraying continuing until all the emulsion is sprayed (the quantity of emulsion is such that complete coating will be achieved).

The materials C are mixed to give a solution, and this solution is then sprayed on to the particles in the fluid bed. Spraying is continued until a particle size of 500 micron is attained.

The result is fine (between 1400 micron and 125 micron (D50~500 micron)) particles of encapsulated flavour. The methyl cellulose coating renders them especially suitable for use in chewing gum.

EXAMPLE 2

Testing in Chewing Gum
Chewing gum samples are prepared according to the following formula:

| | Original |
|---|---|
| Chewing Gum | (500) |
| Mix 1 | |
| Solsona™ T* | 150 |
| Sorbitol** | 100 |
| Lycasin | 48 |
| Mix 2 | |
| Sorbitol** | 175 |
| Glycerine | 20 |
| Aspartame™ | 0.2 |
| Acesulfame™ | 0.2 |
| triacetin | 2.5 |
| MCT*** | 3 |
| lecithin | 0.5 |
| Mix 3 | |
| encapsulated product | 10 |

*commercially-available gum base
**Neosorb™ P60W
***Medium Chain Triglycerides

Mixes 1 and 2 are prepared independently, and are then mixed together in a Z-blade mixer. To one of three such mixes is then added one of three encapsulated flavour products, mixing being continued until they are well incorporated. The two encapsulated flavour products are
product of Example 1
bovine gelatin bloom 250.

The two chewing gums thus produced are tested by submitting to a panel of five professional testers and judged on taste, long-lastingness and flavour strength. The testers assess taste and flavour balance (to ascertain whether the two compositions of Example 1 provided similar qualities to those of the established commercial gelatin-based product).

The qualities sought are:
taste and flavour (purely qualitative—quality of taste, presence of undesirable aftertastes);
flavour intensity (how quickly (in seconds) the flavour became available on chewing)
strength of flavour (how strong this flavour is, measured on a scale of from 1-8, with 8 representing the desired maximum standard).

The following observations may be made:
1. The gum with the gelatin-based flavour is assessed to have the highest strength, rising to 7.5. However, the gum based on the Examples is assessed to be only slightly inferior in this regard, rising to 5.5. This difference is perceptible only to professional testers—a panel of ordinary consumers detected no difference.
2. The gums all release their flavours at very similar rates, all starting at about 15 seconds, rising to a maximum at 80-130 seconds and then falling back to the initial taste level at about 300 seconds.

The starch-based gum is thus an acceptable substitute for the commercial gelatin-based product, and has the advantage of being gelatin-free.

The invention claimed is:
1. An encapsulated flavour particle, comprising a vegetable matter particulate core and a flavour coating, the flavor coating comprising a sprayed blend of an emulsion of flavour and thermoreversible potato starch, the thermoreversible potato starch comprising at least 80% by weight of amylopectin modified with amylomaltase enzyme.
2. The particle according to claim 1, in which the vegetable matter core has a size of from 80-750 microns.
3. The particle according to claim 1, in which the vegetable matter particulate core is selected from tapioca, rice, wheat, maize, sorghum, sago and pea.
4. The particle according to claim 1, in which the flavour is a mint flavour.
5. The particle according to claim 4, in which the flavour is selected from menthol, peppermint and spearmint.

6. The particle according to claim 1, in which the flavour is a fruit flavour.

7. The particle according to claim 6, in which the flavour is selected from berry, apple, pear, strawberry, cherry, lemon and bergamot.

8. The particle according to claim 1, in which the vegetable matter core has a size of from 200-250 microns.

* * * * *